US005746240A

United States Patent [19]
Ayotte et al.

[11] Patent Number: 5,746,240
[45] Date of Patent: May 5, 1998

[54] FREEZE PROTECTION SYSTEM FOR CAR WASHER UNITS

[76] Inventors: Leo Ayotte, 26 Orestis Way, Lewiston, Me. 04240; Paul Obie, Bailey Hill Rd., Poland, Me. 04273

[21] Appl. No.: 733,270

[22] Filed: Oct. 17, 1996

[51] Int. Cl.⁶ .............. E03B 7/12; F16K 37/00; E03C 1/02
[52] U.S. Cl. .............. 137/59; 137/79; 137/240; 137/334; 137/341; 137/899; 138/34; 340/581; 340/584
[58] Field of Search .............. 137/59, 79, 80, 137/240, 334, 341, 899; 138/32, 33, 34, 35; 237/80; 340/580, 581, 584, 588

[56] References Cited

U.S. PATENT DOCUMENTS

| | | | |
|---|---|---|---|
| 2,832,528 | 4/1958 | Spears, Jr. | 138/34 |
| 3,140,720 | 7/1964 | Griswold | 137/59 |
| 3,346,191 | 10/1967 | Roach | 137/59 |
| 3,384,123 | 5/1968 | Saddison | 138/34 |
| 3,420,252 | 1/1969 | Stroble | 137/59 |
| 3,929,154 | 12/1975 | Goodwin | 137/59 |
| 4,286,617 | 9/1981 | Bedient | 137/334 |
| 4,298,021 | 11/1981 | Bozeman | 137/334 |
| 4,351,538 | 9/1982 | Sandt et al. | 138/34 |
| 4,688,273 | 8/1987 | Lyng | 138/33 |
| 4,756,030 | 7/1988 | Juliver | 137/334 |
| 4,848,389 | 7/1989 | Pirkle | 137/62 |
| 5,139,044 | 8/1992 | Otten et al. | 137/62 |
| 5,240,028 | 8/1993 | Hoch, Jr. et al. | 137/80 |
| 5,402,815 | 4/1995 | Hoch, Jr. et al. | 137/80 |
| 5,488,968 | 2/1996 | Price et al. | 137/59 |

*Primary Examiner*—George L. Walton
*Attorney, Agent, or Firm*—William B. Ritchie

[57] ABSTRACT

A freeze protection system for a car wash facility having a plurality of bays and having exposed water lines located in an area that is subjected to freezing temperatures. By using a temperature probe connected via a digital temperature meter to a microprocessor, the system will only operate when the temperature is lower than a pre-set value and will shut off when the temperature is higher than a pre-set value. When activated, a predetermined charge of antifreeze mist will purge the piping in each bay, leaving only a small residual of antifreeze. When a bay is used, the system is reactivated, purging only the bay that has been used. The system is easily adaptable to any number of bays or areas of piping that must be protected.

18 Claims, 5 Drawing Sheets

FREEZE PROTECTION SYSTEM FOR CAR WASHER UNITS

BACKGROUND OF THE INVENTION

1. Field of the Invention

The invention relates to a freeze protection system for car washing systems using freezable liquids, particularly self-service facilities and in bay high-pressure automatic systems.

2. Description of the Related Art

The conduits that supply water, soap, liquid waxes, etc. to self-service car wash units are typically exposed to ambient air so that if the temperature drops below freezing, stationary water in the conduits will freeze. This can result in serious damage to the conduits and associated fittings, requiring, at the very minimum, thawing of the pipes to resume operation.

Despite technological advances of the last thirty years, an effective temperature sensitive to prevent freeze-ups is still absent. One common solution to the problem has been to leave water running continuously when temperatures are likely to drop below freezing. This procedure of allowing water to continuously circulate through the piping is not only a waste of water, but creates an unsafe environment for the patrons as the discharged water builds up as a ice layer in the washing bays. Special drainage units for heating the floor result in further expenses. The use of constantly running water to prevent the water from freezing also leads to a loss of revenue as soon as patrons realize that they do not have to pay for rinsing their cars.

A number of attempts have been tried to resolve the problem. The simplest solution is to blow air through the piping to purge all freezable liquids. However, the possibility always exists that small amounts of water can be trapped in low spots which will ultimately freeze. Further, water in nozzles can also remain. Another attempt has been to wrap heat tapes around the pipes to keep the pipes from freezing. Installation and operation costs for this approach are high and the units are easily broken. Also, the use of heat tape has resulted in fires on more than one occasion. Again, no protection for nozzles is provided using this method.

The use of compressed air that forces anti-freeze and air through the exposed pipes, gated by solenoid has been proposed as a solution to the problem. While this idea would seem to offer some promise, it has not gained acceptance in the industry.

The idea of delivering a fluid via a manifold system, which are gated by solenoid-operated valves, is disclosed in U.S. Pat. No. 3,140,720, issued to Griswold on Jul. 14, 1964. Griswold discloses an automatic fluid distribution system used for irrigation. The system can selectively provide fluid flow in any particular location for any specified time period. No protection against freezing is provided for this method.

Representative of this approach is disclosed in U.S. Pat. No. 3,384,123, issued to Saddison on May 27, 1966. Saddison discloses a device which forces antifreeze and air through the conduit containing the freezable liquid. A siphon is used to pre-measure a charge of antifreeze. A timer connected to the water pump and solenoid triggers the device only after a bay has been used. Once triggered, compressed air forces the charge of antifreeze followed by air/antifreeze to purge the system. This device is not controlled by measuring temperature but is activated each time that the car wash has been used. Further, there is no provision to flush all bays simultaneously, irrespective of whether a bay has just been used or not.

A system that automatically discharges an antifreeze mist when the temperature drops below freezing (or a predetermined temperature); that is able to turn itself on and off in accordance with the outside temperature; that can be customized to service existing car washing facilities as well as new construction; that can be easily installed; and utilizes a microprocessor to meter precise amounts of pressurized mist to each bay to ensure a thorough removal of freezable liquid is not disclosed or suggested in the prior art.

SUMMARY OF THE INVENTION

It is an aspect of the invention to provide a freeze protection system for a car washing facility that can automatically discharge water and other freezable liquids from all car wash bays using antifreeze and compressed air to provide an antifreeze mist when temperatures drop below freezing to prevent freeze damage to the facility.

It is another aspect of the invention to provide a freeze protection system for a car washing facility that turns itself on when the temperature drops below freezing or drops below a predetermined temperature.

Another aspect of the invention is to provide a freeze protection system for a car washing facility that has an external thermometer probe and digital temperature meter that provides a signal to a programmable control board when activation of the system is necessary due to the falling ambient temperature.

It is an aspect of the invention to provide a freeze protection system for a car washing facility that has a temperature sensor which automatically turns off the system when the ambient temperature rises above freezing or above the predetermined temperature, thereby having the system operate only when necessary to save costs.

Another aspect of the invention is to provide a freeze protection system for a car washing facility that provides solenoid valves which are controlled by a microprocessor to provide an accurate, electronically controlled release of a pressurized antifreeze mist.

It is still another aspect of the invention to provide a freeze protection system for a car washing facility that provides a custom manifold which can be adapted to fit an existing car wash facility and is easily maintained.

Another aspect of the invention is to provide a freeze protection system for a car washing facility that provides a manifold that refills automatically from a supply tank after each use.

It is another aspect of the invention to provide a freeze protection system for a car washing facility that provides a control panel which connects to a car wash facility's floor heater to activate the heater when the temperature falls below a predetermined value.

Finally, it is an aspect of the invention to provide a freeze protection system for a car washing facility that eliminates the need for running water continuously to prevent freezing, thereby reducing the volume of water on bay floors that may freeze and cause safety hazards.

The invention is a freeze protection system for a car wash facility having a plurality of bays and having exposed water lines located in an area that is subjected to freezing temperatures. A microprocessor is provided. A manifold, connected to said microprocessor is provided. Said manifold, when activated by said microprocessor provides a flow of pressurized antifreeze mist in a quantity that is sufficient to flush the exposed water lines to prevent the exposed water lines from freezing when encountering freezing temperatures. Temperature detecting means for providing a signal corresponding to the ambient temperature is provided, said temperature detecting means is connected to said microprocessor, wherein said system is activated when said signal corresponds to a temperature that is below a predetermined low temperature and said system is deactivated when said signal corresponds to a temperature that is above a predetermined high temperature. Purging means for purging the exposed water lines of the facility are provided, said purging means being connected to said microprocessor and said manifold. Use detecting means for detecting when one of the wash bays of said facility has been used, wherein said detecting means provides a bay purging signal to said microprocessor wherein said microprocessor is activated to purge only that bay. A supply tank that contains an antifreeze solution is provided. Filling means for maintaining a filled volume of antifreeze within said manifold is provided, said filling means connected to said microprocessor and said supply tank. A compressor is provided, said compressor being controlled by said microprocessor and being connected to said manifold.

Other aspects and advantages of the present invention will become apparent and obvious from a study of the following description and the accompanying drawings which are merely illustrative of the invention.

DETAILED DESCRIPTION OF THE INVENTION

The invention was developed especially for self-service car washing facilities having a plurality of washing bays. However, the system has application in any situation where exposed pipes containing freezable liquids must be protected in a cost effective manner. The invention is an improvement over time release systems, forced air systems and electrical heating tape.

The system combines a digital thermometer, a programmable microprocessor controller, and a custom manifold, that enables the user to selectively purge water from each bay after use only when the temperature is cold enough to cause the water to freeze.

Once the external temperature measures a temperature below a predetermined value, the microprocessor then activates the 3-way master solenoid which communicates with the manifold. A vent is closed and the manifold is pressurized with compressed air which provides the force necessary to provide an antifreeze mist and to propel the mist through the system. An outside air source, such as a compressor, is connected through a regulator to the master solenoid to provide this pressure. Compressed air also forces the antifreeze solution out of the lines leaving behind only residual traces of antifreeze which further protects the system.

The manifold is customized to accommodate the discrete areas that are to be protected, e.g., the number of bays and the bay configuration. Each bay that has exposed pipes at the risk of freezing is provided with its own device solenoid valve. The device solenoid valves are under microprocessor control and, when activated, allow the release of pressurized mist of antifreeze to each device solenoid that is opened. The microprocessor is programmed to open each device solenoid after a recommended two second delay. The length of time that a particular device opens can be programmed so that the each bay, regardless of its pipe volume or distances from the supply manifold, will receive the proper amount of antifreeze mist charge to flush that particular bay.

When the pre-programmed amount of time is reached for a particular device solenoid, it is closed. When all device solenoids have closed, the master solenoid closes the compressed air valve and opens the vent. When the vent opens, the manifold automatically refills. A swing check valve that closes when the manifold is pressurized reopens and allows antifreeze from a supply tank to flow through a gravity supply line into the manifold. Once the level of antifreeze has reached the level in the manifold, the flow stops and the manifold is pressurized so that the system is ready for the next activation.

Figure 1A:
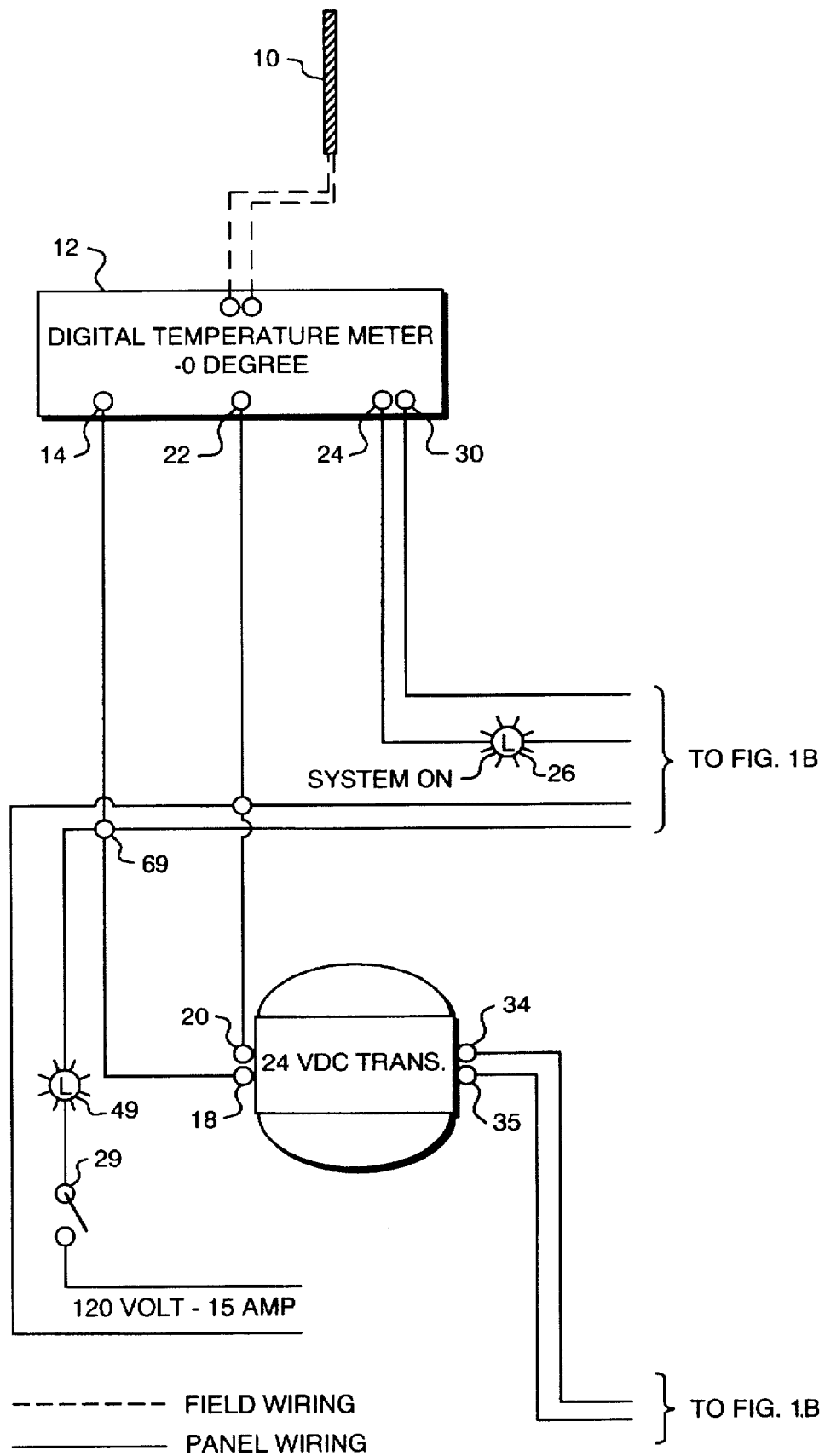
FIG. 1 illustrates a schematic diagram of the electrical circuitry of the freeze protection system for a typical 10 bay self-service car wash facility.
Figure 1B:
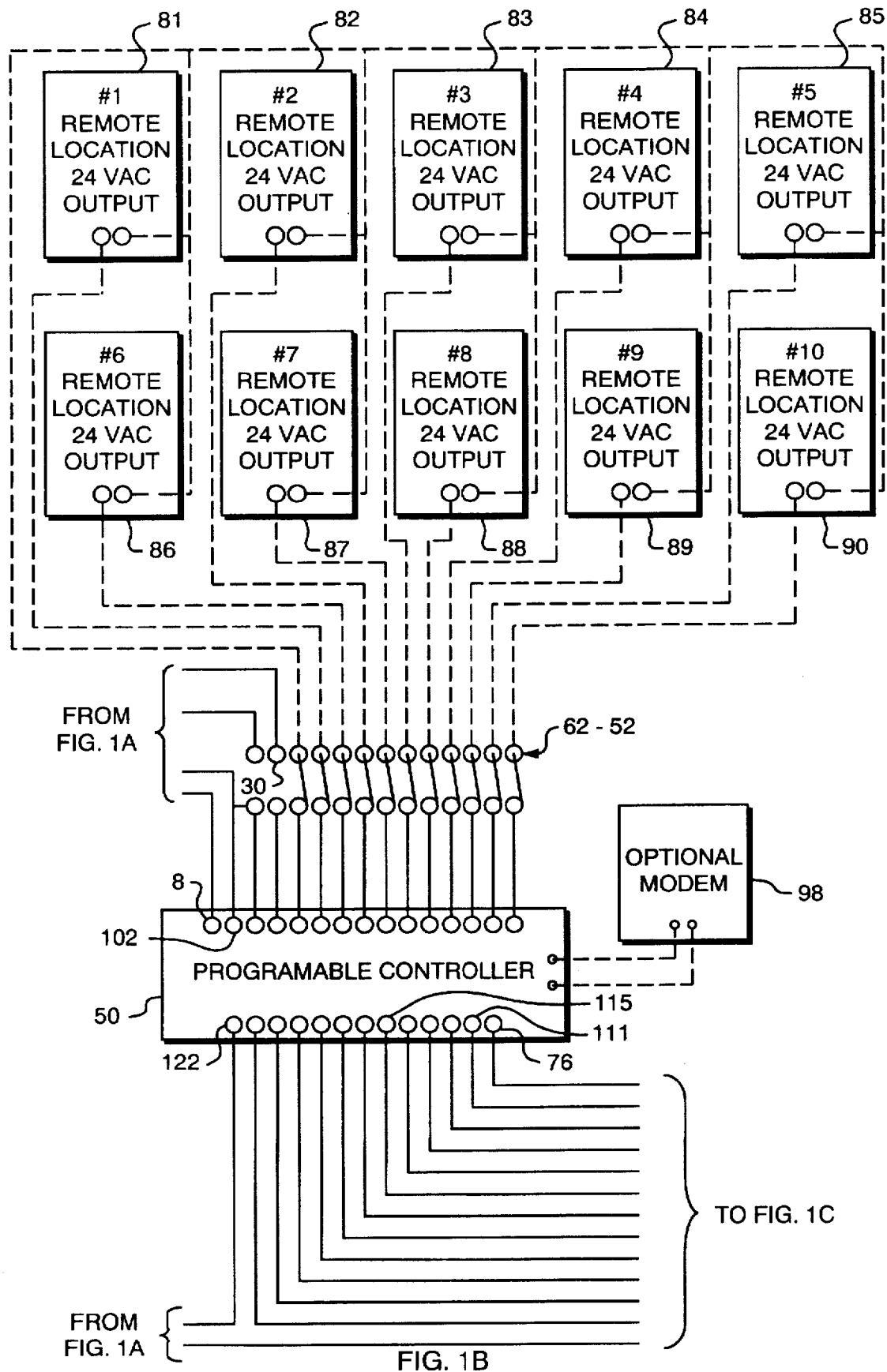
Figure 1C:
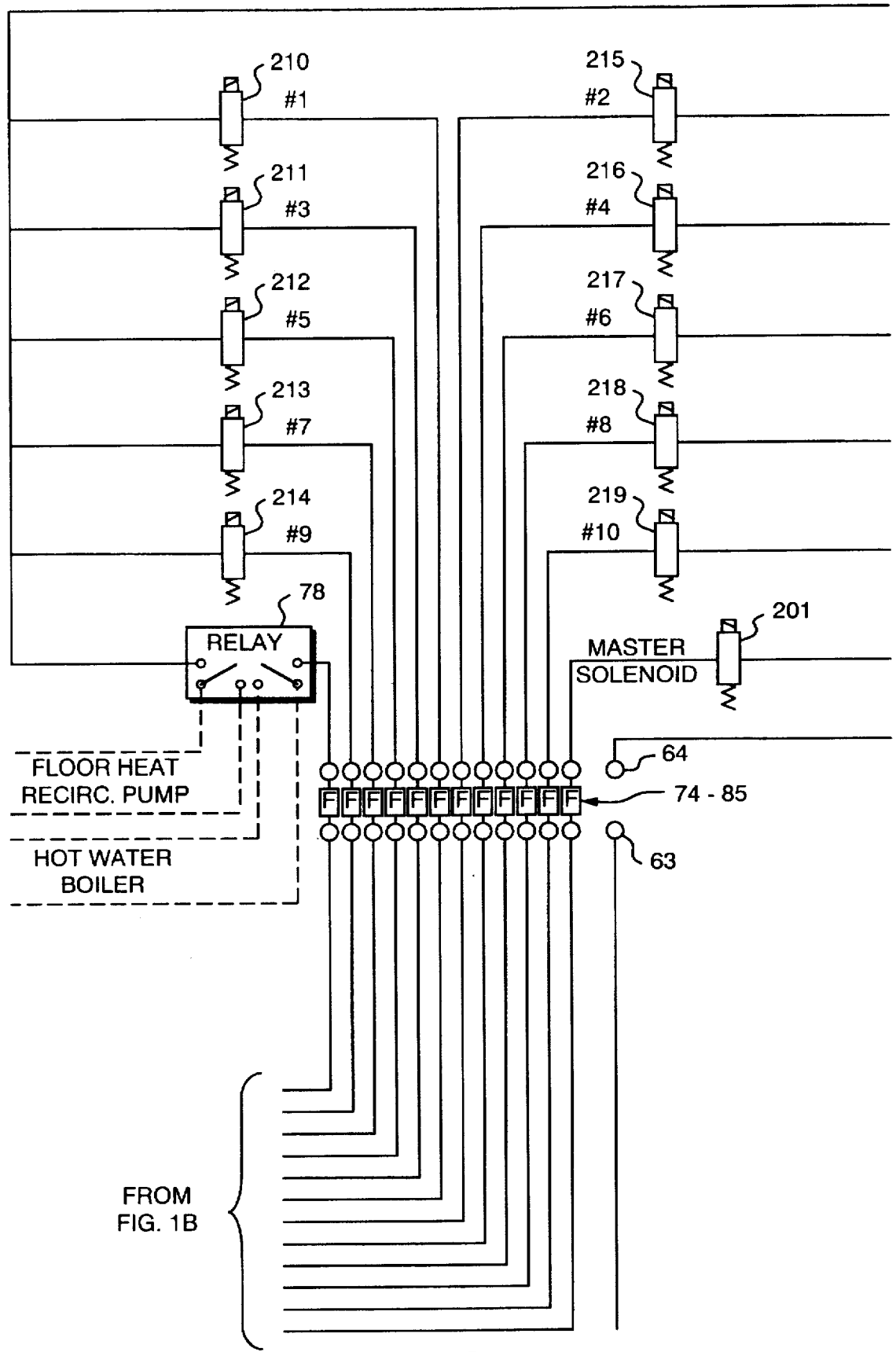

Referring to FIG. 1, the invention is powered through a 120 volt 15 amp AC line 40. Line 40 is connected to on/off switch 29 which is manually activated. When switch 29 is in the "on" position, power is supplied to the invention and pilot light 49 is turned on. At junction 69, power is split to supply digital temperature meter 12, 24 volt DC transformer 16, and programmable controller 50. Programmable controller 50, which is preferably a microprocessor such as the Allen Bradely Micro Logix 1000, is connected to fused outputs 74 through 85, master solenoid 201, preferably ASCO model # 8342C1, device solenoids 210 through 219, and relay 78. Programmable controller 50 is also connected to relays 52 through 62 and receives DC power through panel wire 34 via transformer 16.

Temperature sensing probe 10 is placed outside in a location where an accurate measurement of the ambient temperature can be obtained, that is, out of direct sunlight. When the outside temperature drops below a pre-set number of degrees, indicator light 26 is illuminated, indicating that the system is active, and digital temperature meter 12 signals the controller 50. The pre-set temperature is set on digital temperature meter 12. Digital temperature meter 12 is preferably a unit such as Process Technology DME 20X.

When the outside temperature rises above the pre-set number of degrees, digital temperature meter 12 correspondingly signals the controller 50 and the system is shut off.

Digital temperature meter 12 allows an operator to set the temperature that will activate the system. When the temperature drops to the setpoint, a 120 volt signal is sent to the input of controller 50. This starts all of the internal timers, one timer for each remote device. All of the remote devices are purged with the antifreeze mist in order, e.g., 1 through 10. When the last remote device is purged, the program repeats the process a second time by purging each remote device in order. After the last remote device has been purged, the invention waits for a signal for a remote device that it has been used and a purge is necessary.

A signal from the digital temperature meter 12 to juncture 32 activates relays 52 through 62. Relays 52 are 62 are common 15 amp units well known in the art. When one or more of relays 52 through 62 are active, a 24 volt DC output, originating in the programmable control board, runs through relay 62 to remote locations 81 through 90 which return a 24 volt AC output to the programmable controller 50 through relays 52 through 61. Controller 50 then signals the master solenoid 201 and device solenoids 210 through 219 through connections 111 through 121 and fused outputs 75 through 85. The master solenoid 201 activates first and pressurizes manifold 100. A delay, preferably about two seconds, which is programmed into controller 50, occurs before the device solenoids 210 through 219 are activated and remote wash bays are purged of freezing water or other liquids.

The programmable control board continues to provide power to the remote devices 81 through 90 through relay 62 so that each bay can signal controller 50 after a particular bay has been used. If the system is active, the controller 50 then activates the master solenoid 201 as before but only activates that particular device solenoid. The wash bay that has been used is then purged as previously discussed.

When a remote device is in use, power is sent to the corresponding relay. The relay closes that sends a signal to the input side of the programmable controller 50. When the remote device is shut off, the signal to input side of the programmable controller 50 is also shut off. This causes the internal timer for programmable controller 50 to start for that particular remote device. When the timer reaches a pre-set amount of time, the purge cycle for that device is loaded into memory and the program is initiated.

Figure 2:
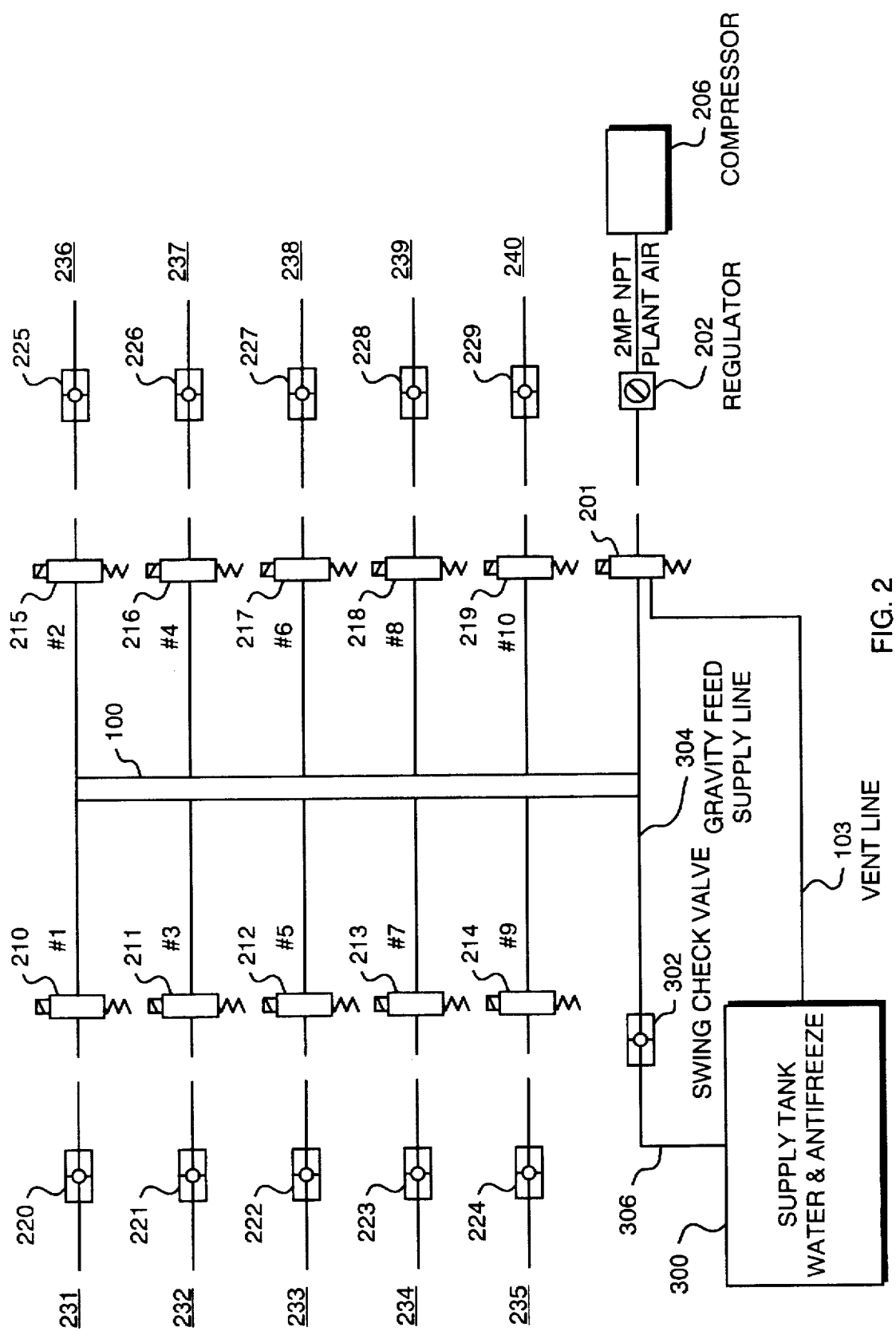
FIG. 2 is a schematic diagram of the manifold that supplies antifreeze solution to the exposed piping in the car wash facility.

FIG. 2 is a schematic diagram of the manifold 100 that supplies antifreeze solution to the exposed piping in the car wash facility. Manifold 100 can vary in size depending on the particular car wash facility that is being protected. Preferably, manifold 100 is constructed of stainless steel tubing, at least 2 inches in diameter. Each remote wash bay or other area requiring protection will have its own corresponding device solenoid, in the example, device solenoids 210 through 219, e.g., remote device 81 corresponds with device solenoid 210 and so on.

Flow of compressed air and venting are both controlled by the three way master solenoid 102. Compressed air provides the necessary pressure to force freezable fluids out and deliver antifreeze mist to the remote devices (customarily wash bays). Air is provided by an outside source, such as compressor 206, and enters through line 204. Line 204 is preferably ¼ inch or larger NPT. A regulator 202 is placed on the line to control the pressure entering the master solenoid 201.

Device solenoids 210 through 219 are 24 volt AC solenoid valves well known in the art. While ten device solenoids are shown in the example, the system can be designed to accommodate more or less numbers of bays or other areas that must be protected against freezing. When one or when all of device solenoids 210 through 219 are activated, it allows antifreeze mist to be forced from manifold 100 through the solenoid valve and into piping 231 through 240. Piping 231 through 240 is preferably ⅜ inch or larger poly tubing, however, different types of tubing could be substituted. Check valves 220 through 229 along the piping outside of each device solenoid are to prevent fluid from flowing back into the solenoids.

Once the antifreeze fluid passes check valves 220 through 229, the pressurized manifold forces the mist through the poly tubing to the remote device. The water within the remote device is flushed out. This antifreeze breaks up any small amounts of frozen material that may be in the lines or in the nozzle. The pressurized mist purges most of the antifreeze and leaves the lines essentially clear except for a small amount of residual antifreeze.

In order to be certain that sufficient antifreeze is available, supply tank 300 is provided. This tank is preferably made of stainless steel capable of holding a sufficient amount of antifreeze solution to keep the system operational for a reasonable length of time. The exact antifreeze solution will, naturally, depend on the geographic location of the car wash that is to be protected so that the coldest expected temperatures can be determined as well as the expected number of days that the system will be operating.

Supply tank 300 is connected to a swing check valve 302 through tube 306, which is preferably a ⅜ inch or larger poly tube. A gravity feed supply line 304 runs from swing check valve 302 into manifold 100. The level of antifreeze solution is maintained in supply tank 300 by a liquid level switch which is mounted on the top of supply tank 300. This switch controls a ½ inch feed solenoid valve which is connected to an exterior water supply and an antifreeze injection valve.

When manifold 100 is not pressurized, antifreeze is allowed to enter and fill up to the level in supply tank 300. When the system is pressurized, no antifreeze will enter manifold 100 due to swing check valve 302.

Figure 3:
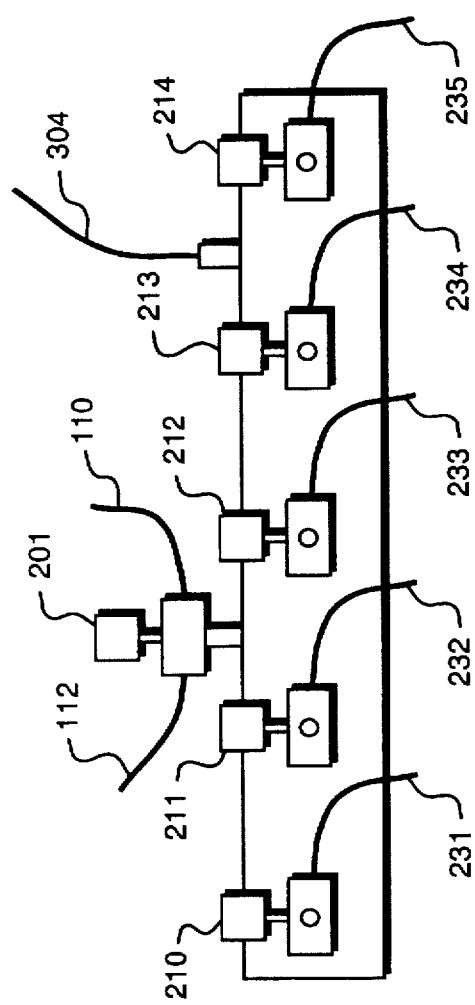
FIG. 3 is a side view of the manifold shown in FIG. 2.

FIG. 3 is a side view of the manifold 100 shown in FIG. 2. The three way master solenoid 102 is connected, preferably through ⅜ inch poly tube, to air flow regulator 202, preferably SPEEDAIR model # 1Z696Z. Vent line 112 is also connected to master solenoid 102 which opens the system to ambient pressure so that manifold 100 can be filled via gravity flow from supply tank 300. When master solenoid 102 is activated, it pressurizes manifold 100 and when it is deactivated, vent line 112 is opened.

Figure 4:
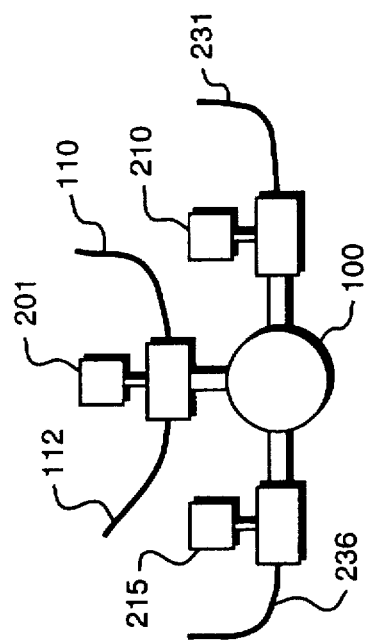
FIG. 4 is an end view of the manifold shown in FIG. 2.

FIG. 4 is an end view of the manifold shown in FIG. 2, which illustrates that device solenoids 210 through 215 can exit from either side and anywhere along manifold 100 as required.

Referring again to FIG. 1, an alternative embodiment of the invention will be described. Connection 76 on controller 50 is used to connect to fuse 74 and relay 78. Relay 78 is tied into a hot water boiler and a floor heating circulator pump to pump hot water into the floor heating systems of remote washing bays. The floor heating system is used to remove ice build-up that results from the water used to wash the vehicles. If left to accumulate, it could be extremely hazardous for the customers of the car wash.

An optional modem connection is provided so that controller 50 can communicate with a computer. In this manner, changes to the program can be made by an operator without having to go to the site. This also enables the operator to check on his equipment to ensure that it is functioning properly. Finally, it enables the operator to determine the approximate amount of money that each remote device has taken in for a given period of time.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A system for preventing the freezing of liquids in a conduit comprising:

a temperature sensor for sensing the ambient temperature in the vicinity of the conduit;

digital temperature means, connected to said temperature sensor, for providing a temperature signal that corresponds to the ambient temperature;

a microprocessor, connected to said digital temperature means, for comparing said signal to a predetermined low temperature and a predetermined high temperature such that when said signal indicates that the ambient temperature is less than said predetermined low temperature, said system is activated to deliver a predetermined volume of antifreeze mist under pressure to said conduit to provide a purged condition, wherein said conduit is protected from freezing; and, wherein said microprocessor further comprises reuse control means for determining when said conduit has been refilled with a freezable liquid, so that said system can be reactivated to deliver another of said predetermined volume of antifreeze mist under pressure to said conduit to again reinstate said purged condition.

2. The system of claim 1 such that when said signal indicates that the ambient temperature is greater than said predetermined high temperature, said system is deactivated.

3. The system of claim 2 further comprising:

a supply tank for holding a reservoir of antifreeze solution such that the volume of the reservoir of said supply tank is much greater than said predetermined volume.

4. The system of claim 3 further comprising:

a manifold connected between said supply tank and said conduit;

an air vent, connected to said manifold, said air vent having an open and closed position, said open and closed positions being controllable by said microprocessor, such that when said vent is in the open position, antifreeze solution from said supply tank can flow via gravity to said manifold, thus filling said manifold with said predetermined volume of antifreeze solution.

5. The system of claim 4 further comprising:

a source of compressed air, controllable by said microprocessor, such that when said source of compressed air is activated by said microprocessor, said predetermined volume of antifreeze mist under pressure is delivered to said conduit to provide said purged condition.

6. The system of claim 5 wherein said conduit is part of a car wash facility having a plurality of bays with at least some of said bays needing protection against freezing and wherein a separate portion of said conduit is located in each bay needing protection against freezing.

7. The system of claim 6 wherein said reuse control means further comprising bay use indicator means for determining when each of said bays needing protection against freezing has been used so that only that portion of said conduit within a bay that has been used will receive said predetermined volume of antifreeze mist under pressure to again reinstate said purged condition.

8. The system of claim 7 wherein said microprocessor further comprises a floor heater control means for activating a floor heating system in said car wash facility.

9. The system of claim 8 wherein said microprocessor further comprises a modem for communicating with a computer.

10. A system for preventing the freezing of liquids in a conduit having a plurality of outlets, said system comprising:

a temperature sensor for sensing the ambient temperature in the vicinity of the conduit;

a temperature meter, connected to said temperature sensor, for providing a first signal when said ambient temperature drops below a predetermined low temperature and for providing a second signal when said ambient temperature rises above a predetermined high temperature; and a microprocessor connected to said temperature meter;

wherein said microprocessor is programmed to activate said system upon receiving said first signal such that a predetermined volume of antifreeze mist is delivered under pressure to said conduit to purge a freezable liquid from all of said plurality of outlets, wherein said conduit and said plurality of outlets are protected from freezing, and programmed to deactivate said system upon receiving said second signal; and, wherein said microprocessor further comprises reuse control means for determining when one of said plurality of outlets has been refilled with said freezable liquid, so that said system can be reactivated to deliver another predetermined volume of antifreeze mist under pressure only to said one of said plurality of outlets that has been refilled with said freezable liquid to again reinstate said purged condition.

11. The system of claim 10 further comprising:

a supply tank for holding a reservoir of antifreeze solution such that the volume of the reservoir of said supply tank is much greater than said predetermined volume, a manifold connected between said supply tank and said conduit; and an air vent, connected to said manifold, said air vent having an open position and a closed position, said open position and said closed position each being controllable by said microprocessor, such that when said vent is in the open position, antifreeze solution from said supply tank can flow via gravity to said manifold, thus filling said manifold with said predetermined volume of antifreeze solution.

12. The system of claim 11 further comprising:

a source of compressed air, controllable by said microprocessor, such that when said source of compressed air is activated by said microprocessor, said predetermined volume of antifreeze mist under pressure is delivered to said conduit to provide said purged condition.

13. The system of claim 12 wherein said microprocessor further comprises floor heater control means for activating a floor heating system.

14. A system for preventing the freezing of liquids in a conduit having a plurality of outlets, said system comprising:

a temperature sensor for sensing the ambient temperature in the vicinity of the conduit;

a temperature meter, connected to said temperature sensor, for providing a temperature signal;

a microprocessor connected to said temperature meter;

wherein, said microprocessor processes said temperature signal such that when said temperature signal indicates that the ambient temperature is less than a predetermined low temperature, said system is activated to deliver a predetermined volume of antifreeze mist under pressure to all of said plurality of outlets of said conduit to provide a purged condition, wherein said conduit is protected from freezing, and such that when the ambient temperature is above a predetermined high temperature, said system is deactivated; and, wherein said microprocessor further comprises reuse control means for determining when one of said plurality of outlets has been refilled with said freezable liquid, so that said system can be reactivated to deliver another predetermined volume of antifreeze mist under pressure only to said one of said plurality of outlets that has been refilled with said freezable liquid to again reinstate said purged condition;

a supply tank for holding a reservoir of antifreeze solution such that the volume of the reservoir of said supply tank is much greater than said predetermined volume;

a manifold connected between said supply tank and said conduit; and an air vent, connected to said manifold, said air vent having an open and closed position, said open and closed positions being controllable by said microprocessor, such that when said vent is in the open position, antifreeze solution from said supply tank can flow via gravity to said manifold, thus filling said manifold with said predetermined volume of antifreeze solution.

15. The system of claim 14 further comprising:

a source of compressed air, controllable by said microprocessor, such that when said source of compressed air is activated by said microprocessor, said predetermined volume of antifreeze mist under pressure is delivered to said conduit to provide said purged condition.

16. The system of claim 15 wherein said temperature signal is a continuous digital signal and wherein said microprocessor process said continuous digital signal by comparing said continuous digital signal with a pair of predetermined values corresponding to said predetermined low temperature and to said predetermined high temperature.

17. The system of claim 15 wherein said temperature signal is an alarm signal and wherein said microprocessor process said alarm signal by activating said system when said alarm is activated and deactivating said system when said alarm signal is deactivated.

18. The system of claim 17 wherein said alarm signal is activated when said ambient temperature is below said predetermined low temperature and is deactivated when said ambient temperature is above said predetermined high temperature.

* * * * *